United States Patent Office 3,221,059
Patented Nov. 30, 1965

3,221,059
POLYMERIZATION OF OLEFIN OXIDES WITH A METAL PHOSPHATE-ORGANOMETALLIC CATALYST
Kenichi Fukui, Sakyo-ku, Kyoto, Sachio Yuasa, Kitashirakawa-Shimobettocho, Sakyo-ku, Kyoto, Tsutomu Kagiya, Hirakata-shi, Osaka, Takeo Shimizu, Fushimi-ku, Kyoto, and Takezo Sano, Kishiwada-shi, Osaka, Japan, assignors to Sumitomo Chemical Company, Ltd., Higashi-ku, Osaka, Japan, a corporation of Japan
No Drawing. Filed May 22, 1962, Ser. No. 196,621
Claims priority, application Japan, May 25, 1961, 36/18,608
9 Claims. (Cl. 260—615)

This invention relates to a novel method for polymerization of olefin oxides. More particularly, it relates to a method for polymerizing olefin oxides by use of a catalyst composition essentially composed of a metal phosphate or phosphite, and an organometallic compound.

Concerning the catalysts to be employed for the polymerization of olefin oxides, Friedel-Crafts type compounds, such as boron trifluoride, tin tetrachloride, and zinc chloride, as well as acids, alkalis, and alkali-earth carbonates, have heretofore been known. Recently, metal halides, such as ferric chloride, metal alkoxides, and metalalkyl compounds have been reported.

However, the preparation of these catalysts is difficult in general, and the reproducibility of the polymerization reaction is inferior, since a minute difference in the preparing conditions and procedures influence to the activity. Besides, the catalyst which gives higher polymerization rate tends to provide a polymer of not so higher molecular weight, while the catalyst which provides a polymer of higher molecular weight tends to give lower polymerization rate.

Accordingly, one object of the invention is to provide a novel method for polymerizing olefin oxides by use of a binary catalyst which can be prepared by a simpler process than in the former cases. Another object is to provide such method by which a polymer having comparatively higher molecular weight can be secured with a comparatively higher polymerization rate, as compared with the cases where a single component of the catalyst is used. Still another object of the invention is to provide such method in which polymers having any desired degree of molecular weight can be obtained by variation of kind and proportion of the both components. Still another object of the invention is to provide such method which can easily be adapted to a continuous process, for example, by employing a fixed bed system of the metal phosphate or phosphite component. Still another object is to provide such method in which the catalyst component is durable for a long time and can be recovered and reused. Other objects and advantages will be apparent from the following description.

The present inventors have previously found a method for polymerizing olefin oxides by contacting an olefin oxide with a catalyst essentially composed of a member selected from the group consisting of metal phosphates and metal phosphites. After their further researches, they have now discovered that such polymerization of olefin oxides can be effected more advantageously and effectively by use of a catalyst composition comprised of a metal phosphate or phosphite and an organometallic compound.

According to this method for polymerizing olefin oxides, polymers of olefin oxide having exceedingly large molecular weight can generally be produced with a high polymerization rate. The polymers thus produced are usable and adaptable as resins for manufacturing various shaped articles, including film and fiber.

A catalyst composition of the present invention is the metal phosphate or phosphite, is designated herein essentially composed of two components, one of which, as component (a) and the other, the organometallic compound, as component (b) for convenience.

Accordingly, the present invention provides a method for polymerization olefin oxides, which comprises contacting an olefin oxide with a catalyst composition essentially composed of (a) a member selected from the group consisting of metal phosphates and metal phosphites and (b) an organometallic compound.

The catalyst component (a), a metal phosphate or a metal phosphite, which is to be employed for the method of the invention, may be selected from the various known ones, of which the chemical composition, the physical properties, and the crystalline structure, are well studied. In other words, the metal phosphate or phosphite employed in the invention may be any of the metal salts of oxyacids of phosphorus, such as metal salts of ortho-, meta-, hypo-, pyro-, polymeta-, and other phosphates and phosphites. Of course, such metal phosphates involve hydrogenphosphates and hydrogenphosphites in the meaning. In still other words, the metal phosphate or phosphite employed in the invention may be selected from the compounds represented by the general composition formula, $H_wM_xPO_y$, wherein M is selected from the group of metals and metal oxide groups (oxygen-containing metal radicals), $w$ is a number not lower than 0 but lower than 3, $x$ is a number higher than 0 but not higher than 3, and $y$ is a number not lower than 2 but not higher than 4. Concretely speaking, M may be any of those metals belonging to I to VIII groups in the Periodic Table, or any of the metal oxide group, such as vanadyl (VO), chromyl ($CrO_2$), neptunyl ($NPO_2$), plutonyl ($PuO_2$), titanyl (TiO), zirconyl (ZrO), hafnyl (HfO), uranyl ($UO_2$), and other oxygen-containing metal radicals. More preferably, M may be selected from the transition metals of IV to VIII groups, especially IV and VIII groups, in the Periodic Table. M may be, for example, Ti, Zr, V, Fe, Cr, Np, Pu, Hf, Mn, and U.

Typical examples of the phosphates and phosphites include orthophosphates, such as $M^1_3PO_4$, $M^1_2HPO_4$, and $M^1H_2PO_4$, pyrophosphates, such as $$M^1_4P_2O_7 \text{ and } M^1_2H_2P_2O_7$$

metaphosphates, such as $(M^1PO_3)_n$, wherein $n$ is a whole number not lower than 2, hypophosphates, such as $M^1_4P_2O_6$, phosphites, such as $M^1_2HPO_3$ and $M^1H_2PO_3$, hypophosphites, such as $M^1H_2PO_2$, tripolyphosphates, such as $M^1_5P_3O_{10}$, polyphosphates, and the like, $M^1$ representing a univalent metal atom or metal oxide group; and the corresponding phosphates and phosphites containing M of bi-, tri, quadri-, and other multivalent metal atom or metal oxide group.

Besides the phosphates and phosphites as listed above, other compounds prepared by reaction of phosphoric acid, phosphorous acid, or a phosphate or a phosphite with a metallic compound (such as halide, oxyhalide, oxide, nitrate, sulfate, or others) may be employed, even if their chemical composition or crystalline structure is not obviously known. Such phosphates have often-times $w$, $x$, and $y$ which are not exactly of whole numbers within the above-identified general composition formula.

For instance, a compound formed, as precipitates, by reaction of a metal halide or a metal oxyhalide with a water-soluble phosphate or phosphite salt in an aqueous medium is separated, washed well with water, dried, calcined if desired, and employed for the method of the invention. Typical examples of such compounds involve phosphate of titanium (composition and structure being not obvious), zirconium pyrophosphate ($ZrP_2O_7$), and others. Or, a compound formed by reaction of a metal oxide with phosphoric acid is employed, typical examples being vanadyl orthophosphate ($VO \cdot PO_4$), zirconyl pyrophosphate ($(ZrO)_2P_2O_7$), chromium metaphosphate ($Cr(PO_3)_3$), and others. Examples of the compounds formed by reaction of a metal sulfate with a phosphate include phosphate of chromium ($CrPO_4$) and others.

In the metal phosphates and phosphites employed in the invention, M in the formula may be single or more than one kind of the metals and metal oxide groups.

Thus, the composition of the catalyst component ($a$) of the invention may vary according to the kind and type of the phosphate and to the condition of the preparation, such as proportion of the amount of the reactants. Besides, the crystalline characteristics may vary according to the condition of the calcination or heat treatment. In consequence, the polymerization rate, as well as the properties of the polymeric product, is varied depending upon the variation of the catalyst component ($a$) used.

The metal phosphate and phosphite catalyst component ($a$) used in the invention is preferably in the dry state. If desired, the catalyst component ($a$) is treated by heat or calcined at a temperature of 100° to 1500° C., more advantageously 100° to 1000° C. The temperature, at which the catalyst component ($a$) is treated by heat calcined, seems to have a relation with the degree of polymerization rate of the product and the polymerization.

If required, the catalyst component ($a$) of the invention may be prepared on a carrier or support, such as silica, alumina, silica-alumina, and various kinds of clay.

The catalyst component ($a$) of the invention has comparatively longer life of activity, and can be regenerated and reused merely by separation from the product and calcination, if required. These facts are also advantages and features of the present invention.

The catalyst component ($b$), an organometallic compound, which is to be employed for the method of the invention, may be selected from the various known ones. In other words, the organometallic compound may be selected from the compounds represented by the general formula, $M'R_mR'_n$, wherein $M'$ is at least one of the metals belonging to groups I to III in the Periodic Table, R is a member selected from the group consisting of alkyl and aryl radicals, R' is a member selected from the group consisting of alkyl, aryl, alkoxy, and acyl radicals and hydrogen and halogen atoms, $m$ is a number not lower than 1, and $n$ is a number not lower than 0, while $m$ plus $n$ is a whole number same as the number of valency of $M'$. Typical examples of the metal $M'$ involve Li, Na, Mg, Ca, Sr, Ba, Zn, Cd, B, Al, etc. Thus, the typical organometallic compounds employed in the invention involve alkyllithiums, alkylsodiums, phenylsodium, dialkylmagnesiums, diphenylmagnesium, alkylmagnesium halides, phenylmagnesium halides, alkylmagnesium alkoxides, dialkylcalciums, dialkylstrontiums, dialkylbariums, dialkylzincs, diphenylzinc, alkylzinc alkoxides, dialkylcadmiums, diphenylcadmium, trialkylborons, trialkyaluminums, dialkylaluminum halides, dialkylaluminum alkoxides, dialkylaluminum hydrides, alkylaluminum dihalides, alkylaluminum dialkoxides, alkylaluminum sesquihalides, alkylaluminum dihydrides, etc.

Besides these organometallic compounds which have single metal atom, a mixture or a complex compound of two or more of these compounds can be used. In such case, $M'$ in the formula, $M'R_mR'_n$, may represent two or more kinds of metal, and $m$ plus $n$ may mean the sum of the numbers of the valencies. Typical examples of them involve tetraethylsodiumaluminum, tetraethylcalciumzinc, tetraethylbariumzinc, tetraethylstrontiumzinc, etc.

These two components ($a$) and ($b$) are mixed together to form the catalyst composition of the invention. The molar ratio of the component ($a$) to the component ($b$) may range from 0.01 to 20, particularly from 0.25 to 10.

The two components may be contacted with each other in a reaction vessel, or they may be mixed before they are charged in the reaction vessel. They may, if desired, be mixed together and heated with agitation for preliminary treatment to improve the characteristics and activity, before they are charged in the reaction vessel. In some cases, the components ($a$) and ($b$) may react with each other at least partially upon such treatment. Any gaseous or low-boiling substance formed upon the contact of the two components, may be removed prior to the charge, thereby advantageous and active catalytic reaction being secured.

By use of the binary components catalyst, olefin oxides can be polymerized more effectively than the case wherein the conventional type of catalyst is employed. If any one of the components is lacking, the effectiveness in the binary catalyst composition with respect to the polymerization rate and the molecular weight of polymer could not be attained. For instance, the sole component ($a$) essentially composed of a metal phosphate or phosphite can catalyze the polymerization reaction of olefin oxides, but the polymerization rate and the molecular weight are lower than in the case of the present invention. When ethylene oxide is polymerized at 80° C. for 3 hours by use of titanium phosphate calcined at 500° C., about 2 grams of polyethylene oxide per gram of catalyst are yielded, while in the same condition, except that an organometallic compound is combinedly used, yields more than 10 grams per gram catalyst of polyethylene oxide. Intrinsic viscosity [$\eta$], determined in water at 35° C., of the polyethylene oxide obtained in the former case is as high as 1, namely molecular weight of approximately $10^4$ to $10^5$, while intrinsic viscosity in the latter case is 3 to 10, namely molecular weight of approximately $10^5$ to $10^7$. If the sole component ($b$), an organometallic compounds, is used, the result is much inferior to the case of the present invention. For instance, in the polymerization of ethylene oxide at 100° C. for 6 hours, use of an alkyl compound of Zn, Cd, or B, hardly yields the polymer, and use of an alkyl compound of Li, Mg, or Al, yields the polymer only in a 5 to 20% yield, which has intrinsic viscosity of as low as 1 to 3, while the same condition, except that a metal phosphate or phosphite is combinedly used, yields the polymer in a 50 to 90% yield, which has intrinsic viscosity of 4 to 8.

Olefin oxides polymerized according to the present invention include ethylene oxide, propylene oxide, and others having up to 9 carbon atoms in the molecule. Among those, ethylene oxide and propylene oxide display the remarkable characteristics of the invention and give beneficial results.

In some cases, other comonomers copolymerizable with the olefin oxide, such as vinyl monomers, aldehydes, and heterocycles, may be employed singly or as a mixture of the plurality of them to obtain copolymers of an olefin oxide with comonomer (or comonomers) according to the present invention.

The polymerization of the present invention may be carried out according to a bulk polymerization process advantageously without solvent. However, it may sometimes be carried out according to a solution, suspension, or dispersion polymerization process. In the latter processes, any solvent or liquid medium may be employed so far as it is inert to the reaction. Examples of them include liquid hydrocarbons and halo-hydrocarbons, ethers, ketones, esters, and the like. Selections of the kind and amount of the solvent or liquid media serve for variation of the properties of the polymeric product.

The contact of an olefin oxide with the catalyst composition according to the invention may be conducted either in a batch system, in a semi-batch system, or in a continuous system. In the latter instance, the catalyst component ($a$) may be in fixed bed, moving bed, or fluidized bed. The reaction conditions may be selected within a broad range. The polymerization temperature may be selected within the range of 0° to 200° C., more preferably within the range of 20° to 130° C. Since lower olefin oxides have lower boiling points, their polymerization is preferably conducted in a pressure vessel or zone.

The reaction product can be recovered by a suitable process from the mixture. The product is separated from the solid catalyst residue essentially composed of component (a), for example, by centrifugation or filtration by use of a suitable solvent for the product (such as chloroform) if required, or in the molten state. The solution of the product separated from the solid catalyst is poured into a solvent, which can not dissolve the product, to form the precipitate of the product.

In some cases, a little amount of the decomposition product from the component (b) is included in the polymer product as ash. If obtainment of the polymer product containing much less ash is contemplated, the product separated from the component (a) as mentioned above may be further purified according to the following procedure. In case of polyethylene oxide, for instance, the polymer is separated from the unreacted monomer and solvent, by evaporation dissolved in water containing a small amount of ammonia. The aqueous solution of the polymer is subjected to centrifugation to remove the resulting hydroxide precipitates, and then subjected to distillation to leave the purified polymer. This procedure is adaptable when the component (b) contains a metal of II and III groups. Or, the polymer product is dissolved in benzene containing a small amount of an alcohol or a chelating agent to decompose the component (b) and to form an alkoxide or a chelate compound which are soluble in organic solvent, and the solution is poured into ethyl ether to isolate and precipitate the polymer. In case of water-insoluble polyolefin oxides the polymer is dissolved in an organic solvent, and the solution is extracted with a dilute hydrochloric acid to remove the catalyst residue. The polymer is then obtained by evaporation of the solution or by pouring the solution in a non-solvent liquid medium.

The polyethylene oxides produced according to the method of the invention are of various properties within the broad ranges, depending upon the kind and proportion of the components, and the conditions of the polymerization, for example, solvent, polymerization temperature, polymerization time, etc. The polyolefin oxide of any state from liquid to solid can be produced, although the properties vary depending upon the kind of monomer. Such state depends mainly upon their molecular weight and crystallinity. The molecular weight of the polyolefin oxides produced according to the method of the invention ranges broadly from 2,000 to 10,000,000. The polymer having comparatively high molecular weight produced according to the invention can be formed in a stretchable film or fiber. For that purpose, polyethylene oxide, polypropylene oxide, etc. are the most preferable.

The present invention will be described in more detail with respect to the following examples, which are, however, merely by way of illustration and not by way of limitation.

EXAMPLE 1

*Preparation of the catalyst component (a)*

(1) Phosphate of titanium: A solution of titanium tetrachloride dissolved in a dilute hydrochloric acid was mixed with the equimolar amount of aqueous phosphoric acid solution, and the resulting precipitate was, after being allowed to stand overnight, filtered and well washed with water, followed by drying at 100° C. for 3 days.

(2) Phosphate of zirconium: An aqueous solution of zirconium oxychloride was mixed with an aqueous solution of a water-soluble phosphate, such as $NaH_2PO_4$, $(NH_4)_2HPO_4$, and the like. The resulting precipitate was filtered and well washed with water, followed by drying at 100° C. for 3 days.

(3) Phosphate of vanadium: Commercially available vanadium pentoxide was mixed with orthophosphoric acid and the mixture was allowed to stand for 5 days with occasional stirring.

The precipitated product was washed with methanol to remove the excess of phosphoric acid and dried.

(4) Phosphate of iron: Commercially available ferrous phosphate was dried at 130° C., for 3 days.

EXAMPLE 2

A catalyst component (a) prepared in Example 1 was treated by heat for 5 hours at the temperatures set forth below in Table I.

A mixture of 0.1 gram of the calcined phosphate and 1 cc. of benzene containing 0.1 gram of diethylzinc was placed in a 10 cc.-volume hard glass ampoule under nitrogen stream. The ampoule was cooled to −30° C., charged with 2.5 grams of ethylene oxide, and fused. The fused ampoule was placed in a small iron autoclave, along with ethylene oxide to balance the presence of the outside and inside of the ampoule. The autoclave was put into a constant temperature bath at 100° C. and rotated, thereby the reaction being allowed to proceed. After 6 hours, the reaction mass taken out was dissolved in benbene containing a small amount of methanol and allowed to stand overnight. The undissolved catalyst residue was removed by centrifugation, and the polymer solution was poured into ethyl ether to precipate the polymer.

The experimental results are tabulated in Table I.

TABLE I

| Catalyst system | | Polymer product | | |
|---|---|---|---|---|
| Component (a) (Temp., ° C.) | Component (b) | Yield, g. | ($\eta$) | $\bar{M} \times 10^{-4}$ |
| Ti-phosphate (500) | $ZnEt_2$ | 0 | | |
| Ti-phosphate (500) | $ZnEt_2$ | 1.05 | 0.44 | 4.8 |
| Fe-phosphate (500) | | 20.7 | 4.6 | 83 |
| Fe-phosphate (500) | $ZnEt_2$ | 0.39 | 0.58 | 6.8 |
| Zr-phosphate (100) | | 2.39 | 3.4 | 58 |
| Zr-phosphate (100) | $ZnEt_2$ | 1.40 | 0.10 | 0.8 |
| Zr-phosphate (700) | | 1.81 | 3.6 | 62 |
| Zr-phosphate (700) | $ZnEt_2$ | 0.62 | 0.56 | 6.5 |
| | | 1.04 | 1.8 | 27 |

In this and the following tables, numbers in the parentheses in the column of component (a) refer to the temperature of the heat treatment in degrees centrigrade, this heat treatment being operated for 5 hours. The intrinsic viscosity ($\eta$) was determined in water solvent at 35° C. by use of Ubelhode's viscosimeter. The molecular weight was calculated according to the Bailey and Gallard equation, $$(\eta) = 6.4 \times 10^{-5} M^{0.82} \text{ (in water at 35° C.)}$$

(See J. Applied Polymer Sci. 1, 56–62 (1959).

EXAMPLE 3

Ethylene oxide was polymerized according to the similar procedure as Example 1, using 1 cc. of n-heptane containing 0.1 gram of triethylaluminum, instead of diethylzinc and benzene in Example 2. The reaction temperature was 25° to 30° C. and the amount of ethylene oxide placed in the ampoule was 1.5 grams. The results are set forth in Table II.

TABLE II

| Component (a) (Temp., ° C.) | Polymer product | | |
|---|---|---|---|
| | Yield, g. | ($\eta$) | $\bar{M} \times 10^{-4}$ |
| Ti-phosphate (500) | Trace | | |
| V-phosphate (500) | 0.54 | 0.46 | 5.1 |
| Fe-phosphate (500) | 0.06 | 1.5 | 21.5 |
| Zr-phosphate (100) | 0.11 | 0.60 | 7.0 |
| Zr-phosphate (300) | 0.32 | 0.47 | 5.2 |
| Zr-phosphate (700) | 0.21 | 2.8 | 46 |
| | 0.23 | 2.8 | 46 |

EXAMPLE 4

Using, as the component (b), each 0.1 gram of triethylboron, butyllithium, diethylmagnesium, ethylmagnesium bromide, and tetraethylcalcimuzinc, ethylene oxide was polymerized in the similar way. The results are as follows.

TABLE III

| Catalyst system | | Ethylene oxide, g. | Temp., °C. | Time, hrs. | Polymer product | | |
|---|---|---|---|---|---|---|---|
| Component (a) (Temp °C.) | Component (b) | | | | Yield g. | ($\eta$) | $\overline{M} \times 10^{-4}$ |
| Ti-phosphate (500) | BEt$_3$ (B) | 2 | 100 | 6 | 0.75 | 0.65 | 7.8 |
| Ti-phosphate (500) | LiBu (B) | 2 | 15 | 48 | 0.42 | 1.7 | 25 |
| Zr-phosphate (100) | MgEt$_2$ (E) | 1.5 | 15 | 17 | 0.46 | 10.9 | 240 |
| Zr-phosphate (900) | MgEt$_2$ (E) | 1.5 | 15 | 17 | 1.09 | 9.2 | 195 |
| Zr-phosphate (500) | MgEtBr (E) | 1.5 | 15 | 48 | 0.39 | 8.4 | 175 |
| Ti-phosphate (500) | CaZnEt$_4$ (B) | 1.5 | 80 | 8 | 0.77 | 4.1 | 73 |

In this table, the B and E in the parentheses in the column of the component (b) mean benzene solution and ethyl ether solution, respectively.

EXAMPLE 5

In a glass ampoule (15 cc. content), 0.1 gram of phosphate of titanium prepared as in Example 1 and calcined at 500° C. was placed. The ampoule was fully flushed with nitrogen, then added with 1 cc. of n-heptane containing 0.1 gram of triethylaluminum under nitrogen stream, charged with 2 grams of propylene oxide in 6 cc. of ethyl ether at −78° C. under nitrogen stream, and fused. The content of the ampoule was warmed to 25° to 30° C., thereby the polymerization being allowed to proceed. After one day, the reaction mass was distilled in vacuo to drive off the unreacted monomer, ethyl ether and heptane. The remaining solid product was dissolved in benzene, and the solution was subjected to centrifugation to separate the insoluble substance. The mother liquor is mixed with a dilute hydrochloric acid to decompose and extract the aluminum compound, washed with water, and dried over anhydrous potassium carbonate. By distillation of benzene from the liquor, 0.63 gram of solid polypropylene oxide was obtained, a part of which was insoluble in cold acetone, namely crystalline polymer.

EXAMPLE 6

One tenth gram of phosphate of zirconium, calcined at 500° C., was contacted under agitation with 1 cc. of heptane solution containing 0.1 gram of triethylaluminum. After a half hour, the mixture was centrifuged to remove the heptane-soluble part, and the solid portion was placed in a glass ampoule. In the similar way as in Example 2, 2.5 grams of ethylene oxide was polymerized at 100° C. for 6 hours under rotating agitation, to obtain 0.53 gram of solid polymer, which has intrinsic viscosity of 2.6 (i.e. molecular weight of about 420,000).

What is claimed is:
1. A method for the production of olefin oxide polymers having molecular weights of about 2,000 to 10,000,000, which comprises polymerizing an olefin oxide having the formula:

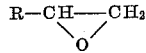

wherein R is a radical selected from the group consisting of hydrogen and alkyl radicals containing from 1 to 7 carbon atoms, in the presence of a catalyst essentially constituted of:
(a) a phosphate having the formula $H_wM_xPO_y$ wherein M is a radical selected from the group consisting of Ti, Zr, V, Fe, Cr, Np, Pu, Hf, Mn, and U and of the oxy-metallic radicals thereof, $w$ is a number smaller than 3, $x$ is a number higher than 0 but not higher than 3 and $y$ is a number higher than 2.0 but not higher than 4 and;
(b) an organometallic compound having the formula $M'R'_mR'_n$ wherein M' is a metal selected from the group consisting of Li, Na, Mg, Ca, Sr, Ba, Zn, Cd, B, and Al, R is a member selected from the group consisting of lower alkyl radicals and phenyl radical, R' is a member selected from the group consisting of lower alkyl radicals, phenyl radical, and hydrogen and bromide atoms, $m$ is a number not lower than 1, $n$ being such that the sum $m+n$ is a whole number corresponding to the valence of M';

the molar ratio, in said catalyst, of said compound defined in (a) to said compound defined in (b) ranging from about 0.01 to about 20, the polymerizing step being operated for a period of time sufficient to yield a polymer having a molecular weight of about 2,000 to 10,000,000, at a temperature from about 20 to 130° C.

2. A method according to claim 1, wherein the catalyst component (a) is calcined at a temperature of 100° to 1,500° C.

3. A method according to claim 1, wherein the olefin oxide is selected from the group consisting of ethylene oxide and propylene oxide.

4. A method according to claim 1, wherein the organometallic compound as defined in (b) is an alkyl-metallic compound.

5. A method according to claim 1, wherein the organometallic compound as defined in (b) is triethylboron.

6. A method according to claim 1, wherein the organometallic compound as defined in (b) is diethylzinc.

7. A method according to claim 1, wherein the organometallic compound as defined in (b) is triethylaluminum.

8. A method according to claim 1, wherein the organometallic compound is diethylmagnesium.

9. A method according to claim 2, wherein the organometallic compound is butyllithium.

References Cited by the Examiner
UNITED STATES PATENTS

| | | | |
|---|---|---|---|
| 2,569,092 | 9/1951 | Deering | 252—437 |
| 2,870,100 | 1/1959 | Stewart et al. | 260—2 |
| 2,956,959 | 10/1960 | Detter | 260—2 |
| 3,018,258 | 1/1962 | Meier et al. | 260—2 |

FOREIGN PATENTS 594,025   3/1960   Canada.

OTHER REFERENCES

Lee et al.: "Epoxy Resins," McGraw-Hill, New York, 1957, page 147 relied on.

WILLIAM H. SHORT, *Primary Examiner.*

JOSEPH R. LIBERMAN, *Examiner.*